US012167790B1

(12) United States Patent
Bollman

(10) Patent No.: US 12,167,790 B1
(45) **Date of Patent: *Dec. 17, 2024**

(54) UNIVERSAL MOUNT PLATFORM SYSTEM WITH BENT LINEAR DUAL-RAIL MOUNT PLATFORM MODULE

(71) Applicant: Clifford Bollman, Sun City West, AZ (US)

(72) Inventor: Clifford Bollman, Sun City West, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,102

(22) Filed: May 31, 2024

Related U.S. Application Data

(63) Continuation of application No. 17/893,161, filed on Aug. 22, 2022, now Pat. No. 12,035,803.

(60) Provisional application No. 63/305,256, filed on Jan. 31, 2022, provisional application No. 63/235,618, filed on Aug. 20, 2021.

(51) Int. Cl.

| | |
|---|---|
| ***A47B 13/02*** | (2006.01) |
| ***A47B 13/08*** | (2006.01) |
| ***B25H 1/02*** | (2006.01) |

(52) U.S. Cl.
CPC ............ *A47B 13/02* (2013.01); *A47B 13/088* (2013.01); *B25H 1/02* (2013.01)

(58) Field of Classification Search
CPC ................................ A47B 13/02; A47B 13/06
See application file for complete search history.

(56) References Cited

U.S. PATENT DOCUMENTS

| | | | | | |
|---|---|---|---|---|---|
| 2,467,080 | A * | 4/1949 | Duer | A47B 13/06 | 248/188.7 |
| 2,562,022 | A * | 7/1951 | Duer | A47B 13/06 | 248/188.7 |
| 3,863,875 | A * | 2/1975 | Olson | A47B 13/06 | D6/708.16 |
| 4,105,250 | A * | 8/1978 | Caldwell | A47C 5/04 | 108/150 |
| D284,918 | S * | 8/1986 | McBride | D6/708.16 | |
| 4,825,781 | A * | 5/1989 | Palmer | A47B 3/06 | 108/150 |
| 9,820,572 | B1 * | 11/2017 | Kuehn | A47B 47/0083 | |
| 10,781,841 | B1 * | 9/2020 | Bollman | E04C 3/04 | |
| 11,083,283 | B1 * | 8/2021 | Shyu | A47B 13/003 | |
| 12,035,803 | B1 * | 7/2024 | Bollman | A47B 13/088 | |

* cited by examiner

*Primary Examiner* — Daniel J Rohrhoff
(74) *Attorney, Agent, or Firm* — Rylander & Associates, PC; Philip R. M. Hunt

(57) ABSTRACT

A universal mount platform for office and industrial modular workstations including a linear dual-rail mount platform module. A linear dual-rail mount platform module has two double rail slot columns coupled by two sets of dual rails. Mount slots between dual rails are set and maintained by spacers or end plates.

10 Claims, 16 Drawing Sheets

UNIVERSAL MOUNT PLATFORM SYSTEM WITH BENT LINEAR DUAL-RAIL MOUNT PLATFORM MODULE

CROSS-REFERENCE TO RELATED APPLICATION

This application is a continuation of U.S. application Ser. No. 17/893,161, filed 2022 Aug. 22, which claims the benefit of U.S. Provisional Applications No. 63/235,618, filed 2021 Aug. 20, No. 63305256, filed 2022 Jan. 31, all incorporated herein by reference.

TECHNICAL FIELD

The present invention relates to modular assembly systems. More particularly, the present invention relates to modular assembly systems for office and industrial workstations.

BACKGROUND

Modular building assembly systems have long been available for the construction and erection of various structures such as office cubicles, industrial workstations, and scaffolding. Such modular building assembly systems often lack durability, strength and flexibility.

BRIEF DESCRIPTION OF THE DRAWINGS

The accompanying drawings, which are incorporated into and constitute a part of this specification, illustrate one or more embodiments of the inventive subject matter and, together with the detailed description, serve to explain the principles and implementations thereof. Like reference numbers and characters are used to designate identical, corresponding, or similar components in different figures.

DETAILED DESCRIPTION

Figure 1D:
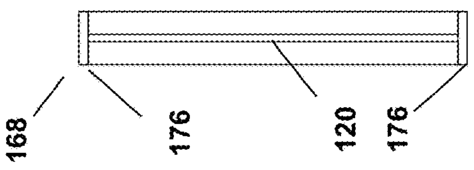
FIG. 1D shows a side view of a shorter double rail slot column 168.

In describing the one or more representative embodiments of the inventive subject matter, use of directional terms such as “upper,” “lower,” “above,” “below”, “in front of,” “behind,” etc., unless otherwise stated, are intended to describe the positions and/or orientations of various components relative to one another as shown in the various Figures and are not intended to impose limitations on any position and/or orientation of any component relative to any reference point external to the Figures.

In the interest of clarity, not all of the routine features of representative embodiments of the inventive subject matter described herein are shown and described. It will, of course, be appreciated that in the development of any such actual implementation, numerous implementation-specific decisions must be made in order to achieve specific goals, such as compliance with application and business-related constraints, and that these specific goals will vary from one implementation to another and from one developer to another. Those skilled in the art will recognize that numerous modifications and changes may be made to the representative embodiment(s) without departing from the scope of the claims. It will, of course, be understood that modifications of the representative embodiments will be apparent to those skilled in the art, some being apparent only after study, others being matters of routine mechanical, chemical and electronic design. No single feature, function or property of the representative embodiments is essential. In addition to the embodiments described, other embodiments of the inventive subject matter are possible, their specific designs depending upon the particular application. As such, the scope of the inventive subject matter should not be limited by the particular embodiments herein described but should be defined only by the appended claims and equivalents thereof.

Universal Mount Platform System

The Universal Mount Platform System is a flexible system for building ergonomic working stations that maximizes three-dimensional utilization of a workspace. The Universal Mount Platform System comprises substructure modules and accessory attachment mechanisms. The substructure modules provide the foundation on which the accessory attachment mechanisms may be mounted. The accessory attachment mechanisms hold physical components needed for the work of the workstation, such as tabletops or other work surfaces, lighting fixtures, computer monitors, cable management, and storage bins.

Rails

Rails are the primary horizontal strength members in the Universal Mount Platform System. A rail is a tube, typically rectangular or square in cross section. Square tube rails are typically 1¼ inch square cross-section, 14-gauge tube thickness, but may have other suitable dimensions. In some alternative embodiments, a rail is a channel bar, rectangular or square in cross-section. In yet other alternative embodiments, the rail is a strut channel, rectangular or square in cross-section, with inwards-curving lips to facilitate mounting of components. Strut channel rails typically have a 1⅝ by 1⅝ inch square cross section but may have other suitable dimensions. In some embodiments, the strut channel rails have reinforcing bars across the open front of the channel at intervals along the length of the rail. In some embodiments, a rail may have fastener holes spaced at intervals along the rail to facilitate coupling to other rails, to position holders, slices, etc. The fastener holes typically penetrate through the rail orthogonal to the long axis of the rail. The fastener holes are typically circular but may be elongated slots in some embodiments. Perforated rails typically have fastener holes at 2-inch intervals. The fastener holes in the rails are typically unthreaded, but some may be threaded. A rail is typically made of metal, such as steel, but may be made of other suitable materials. In some embodiments, the rails may have end plates with fastener holes that may be threaded.

Multi-Rail Mount Platforms

Many of the mount platforms in the Universal Mount Platform System are based on multiple parallel rails with gaps (slots) between the rails. The gaps are wide enough to just barely allow the shaft of a typical fastener used with the system to pass through, but not wide enough to allow the head of the typical fastener to pass through. In the embodiments shown and described herein, the typical fastener used has a ⅜" diameter shaft and the gaps are 13/32." The rails and gaps provide a strong and flexible system for mounting of accessories. A typical accessory (such as a post) has a flange through which one or more fasteners pass. The one or more fasteners then pass through the gap between the rails and through holes in a backer plate. The fastener engages with a retainer on the other side of the backer plate or with the backer plate itself. Most typically, the fastener is threaded and engages with a threaded retainer or with a threaded hole in the backer plate.

Welded Linear Dual-Rail Mount Platform Module

Figure 1C:
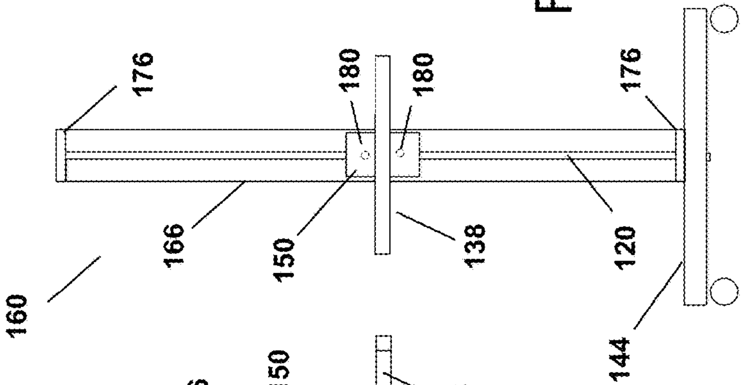
FIG. 1C shows a side view of the first embodiment of the welded linear dual-rail mount platform module 160.
Figure 1A:
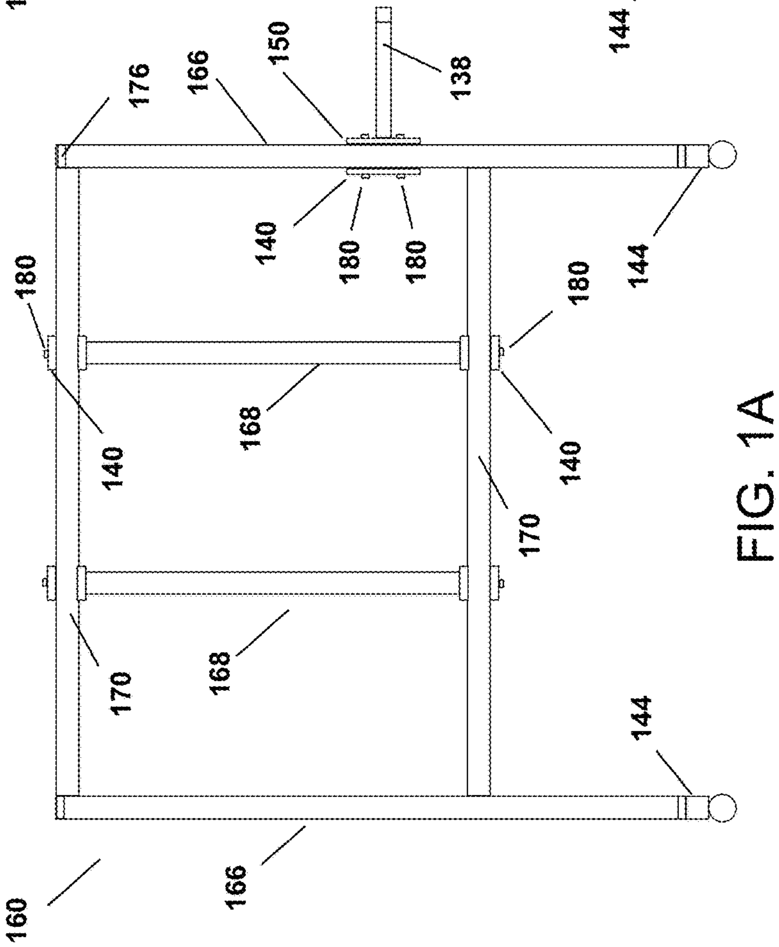
FIG. 1A shows a front view of a first embodiment of a welded linear dual-rail mount platform module 160.
Figure 1B:
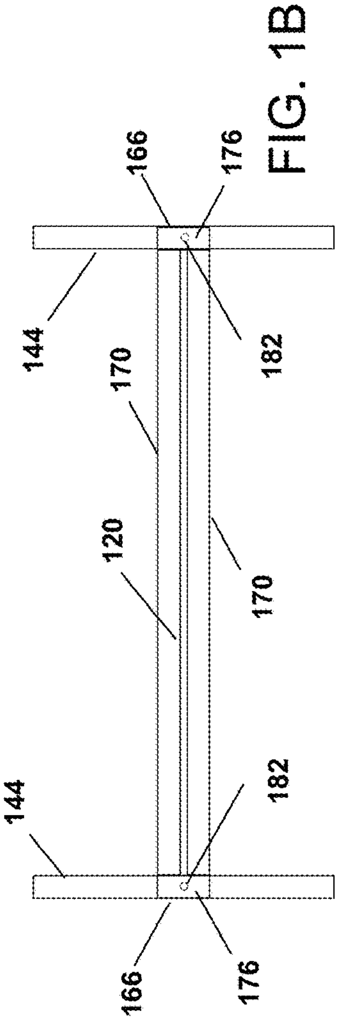
FIG. 1B shows a top view of the first embodiment of the welded linear dual-rail mount platform module 160.

FIG. 1A shows a front view of a first embodiment of a welded linear dual-rail mount platform module 160. FIG. 1B shows a top view of the first embodiment of the welded linear dual-rail mount platform module 160. FIG. 1C shows a side view of the first embodiment of the welded linear dual-rail mount platform module 160. FIG. 1D shows a side view of a shorter double rail slot column 168. The first embodiment welded linear dual-rail mount platform module 160 comprises two double rail slot columns 166 coupled by two horizontal dual rail slot beams 170 by welding. In other embodiments, the double rail slot columns 166 are coupled to the horizontal dual rail slot beams 170 by fasteners. Each horizontal dual rail slot beam 170 are separated by a mount slot 120. The double rail slot columns 166 each have two rails with two end plates 176 welded to each end of the rails. The end plates 176 set and maintain the mount slot 120 between the rails of the first embodiment welded linear dual-rail mount platform module 160. The end plates 176 each have a threaded fastener hole 182 for facilitating connecting to other components.

A footing 144 is coupled to the bottom of each double rail slot column 166 by passing a fastener through the footing 144 and engaging with the threaded fastener hole 182 in the end plate 176 of the double rail slot column 166. Accessories (e.g., accessory arm 138) may be coupled to the double rail slot columns 166 by passing one or more fasteners 180 through an accessory arm mount plate 150 (part of the accessory arm 138), passing through the mount slot 120 in the double rail slot column 166, passing through one or more fastener holes in a backer plate 140 and engaging with a threaded retainer. In some embodiments, the fastener holes in the backer plate 140 are threaded, with which the fasteners 180 engage instead of threaded retainers.

One or more double rail slot columns 168 of shorter height may be coupled between and to the two dual rail slot beams 170. This provides additional attachment points for accessories. Accessories attached in the mount slots 120 of the first embodiment welded linear dual-rail mount platform module 160. Accessories attached in the mount slots 120 of the short double rail slot column 168 in the same manner as described for the full size double rail slot column 166.

Figure 2:
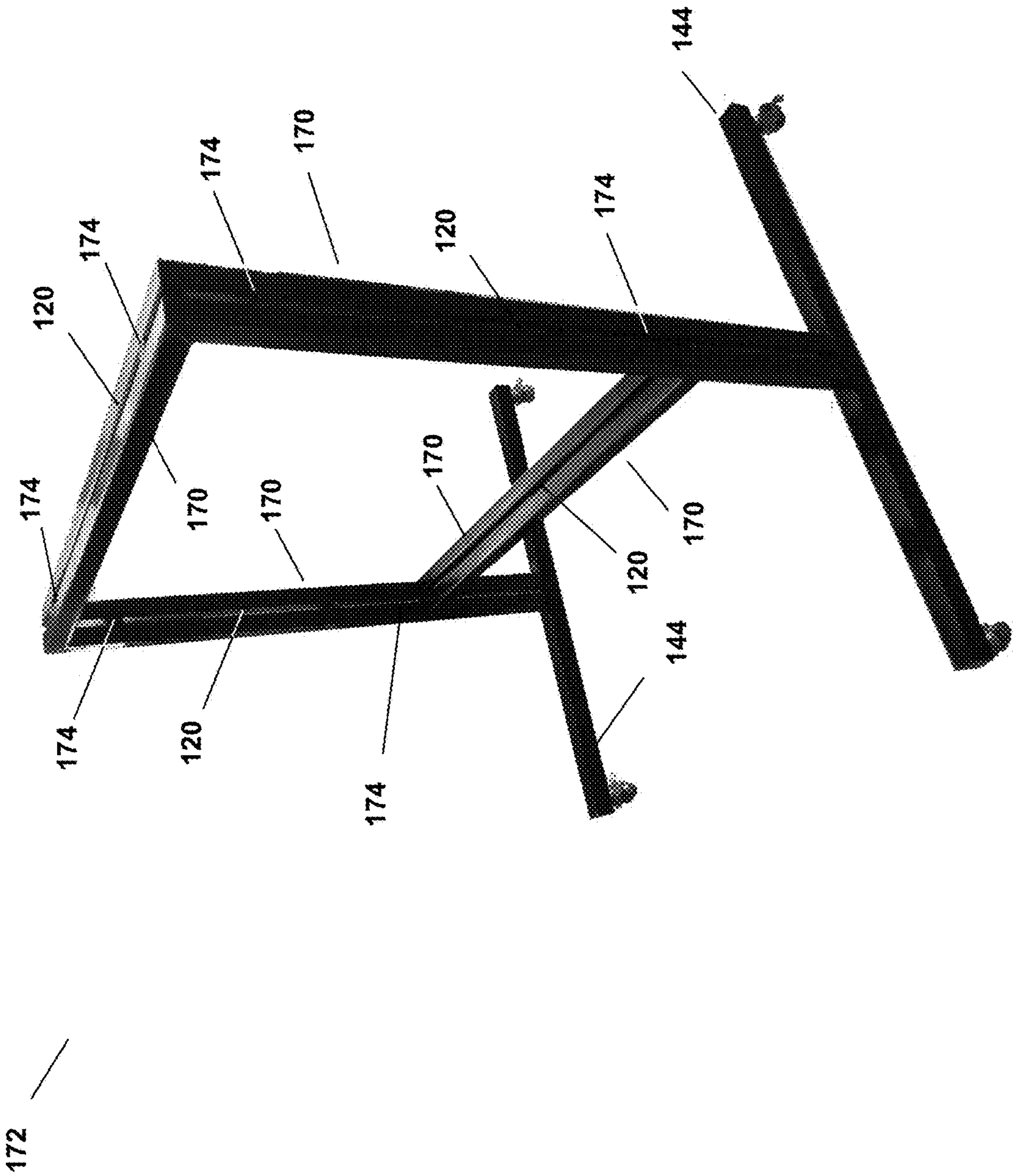
FIG. 2 shows a perspective view of a second embodiment welded linear dual-rail mount platform module 172.

FIG. 2 shows a perspective view of a second embodiment welded linear dual-rail mount platform module 172. The second embodiment welded linear dual-rail mount platform module 172 is similar to the first embodiment welded linear dual-rail mount platform module 160, except instead of using end plates 176 to set and maintain the mount slots 120 on double rail slot columns 166, the second embodiment welded linear dual-rail mount platform module 172 uses spacers 174 welded inside the mount slots 120 of the dual rail slot beams 170. Accessories may be attached in the mount slots 120 of the second embodiment welded linear dual-rail mount platform module 172 in the same manner as described in the first embodiment welded linear dual-rail mount platform module 160.

Figure 3:
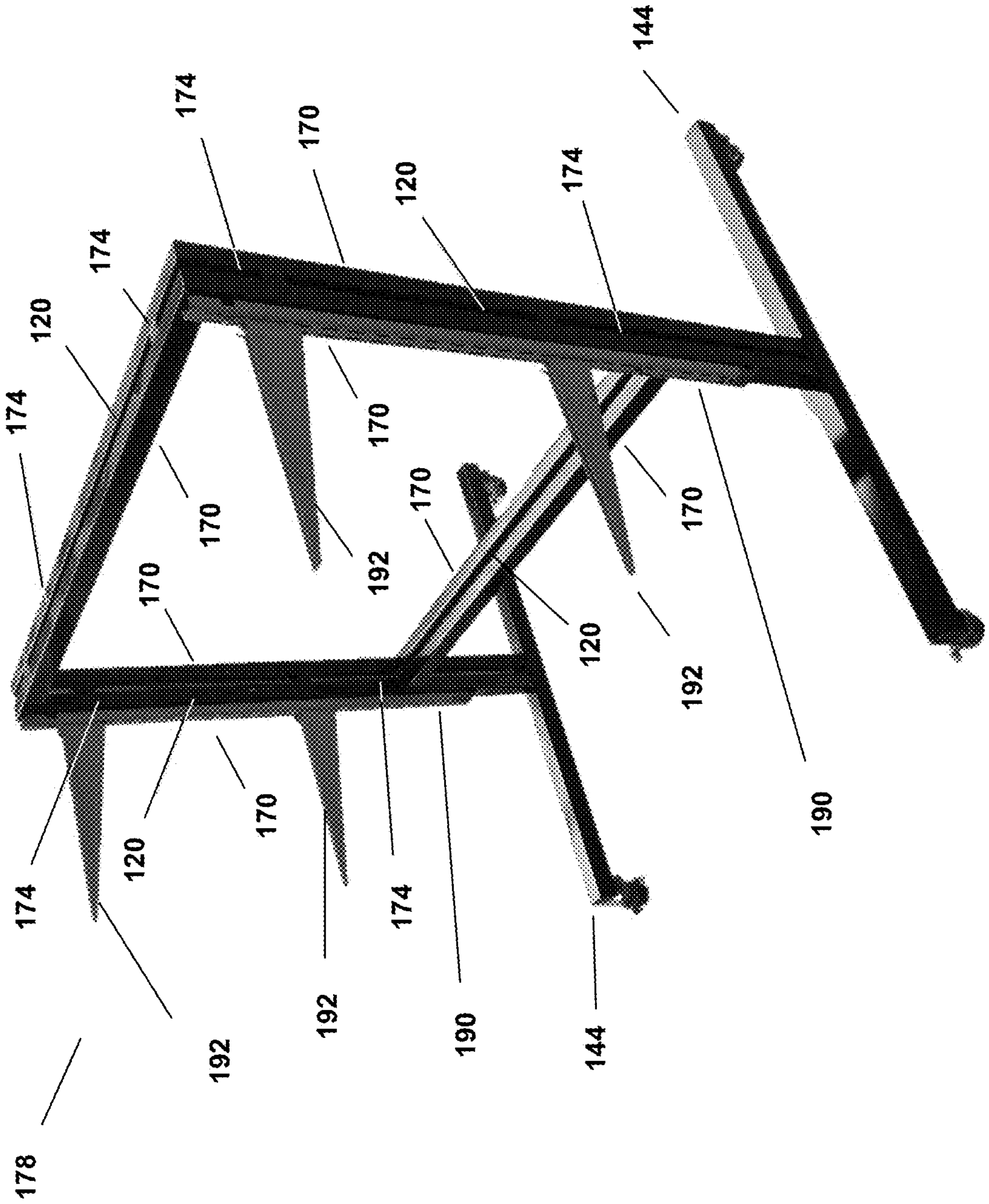
FIG. 3 shows a perspective view of a second embodiment welded linear dual-rail mount platform module with shelf holders 178.

FIG. 3 shows a perspective view of a second embodiment welded linear dual-rail mount platform module with shelf holders 178. Two shelf holder strips 190 are attached, one to each vertical dual rail slot beam 170. The shelf holder strips 190 have slots which receive tabs on shelf holders 192.

Figure 4:
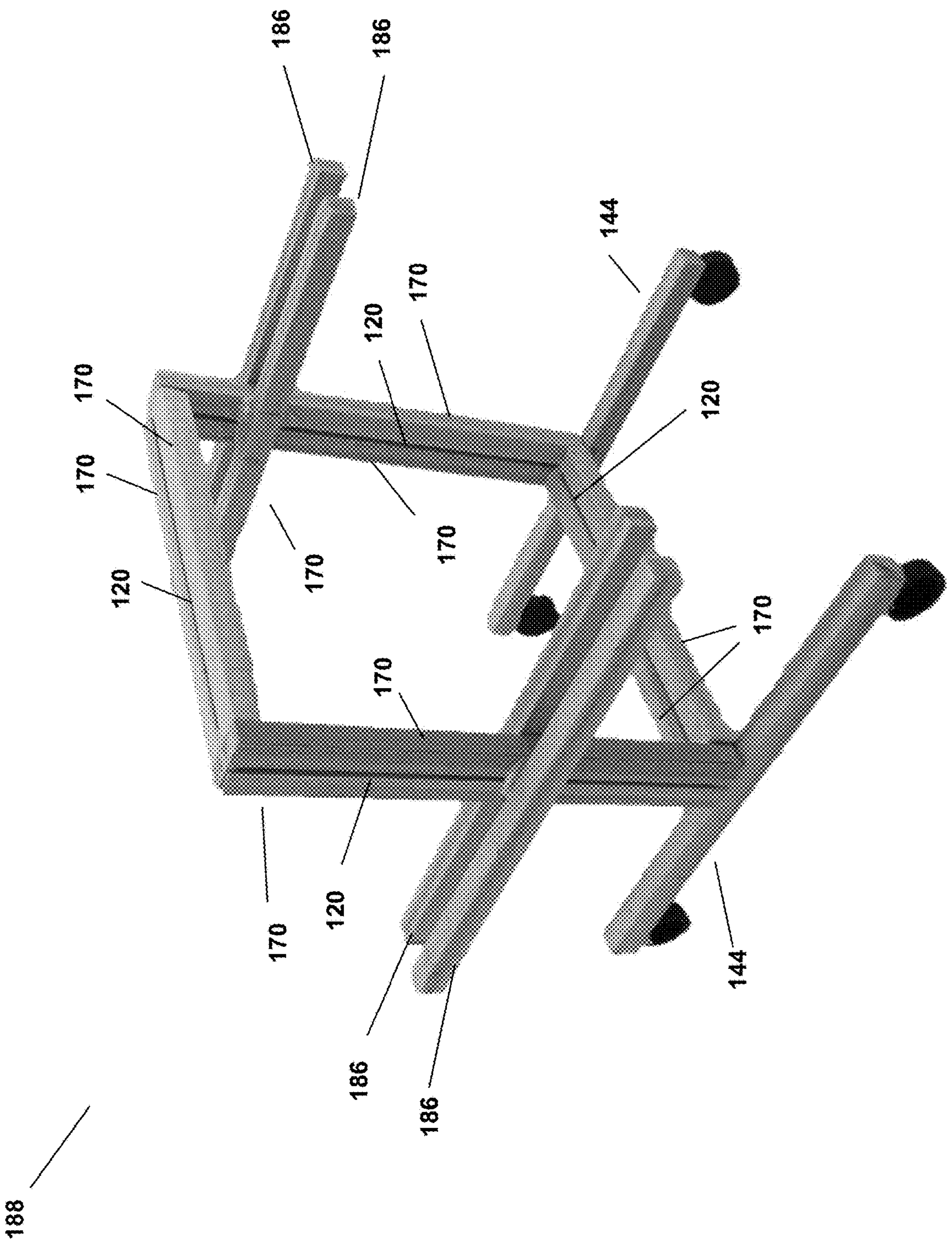
FIG. 4 shows a perspective view of a third embodiment welded linear dual-rail mount platform module 188.

FIG. 4 shows a perspective view of a third embodiment welded linear dual-rail mount platform module 188. The third embodiment welded linear dual-rail mount platform module 178 is similar to the second embodiment welded linear dual-rail mount platform module 172, except that the lower horizontal dual rail slot beam 170 is positioned lower, flush with the bottom of the vertical dual rail slot beams 170. Two sets of accessory arms 186 are attached. Accessories attached in the mount slots 120 of the third embodiment welded linear dual-rail mount platform module 178 in the same manner as described in the first embodiment welded linear dual-rail mount platform module 160.

Bent Linear Dual-Rail Mount Platform Module

Figure 5:
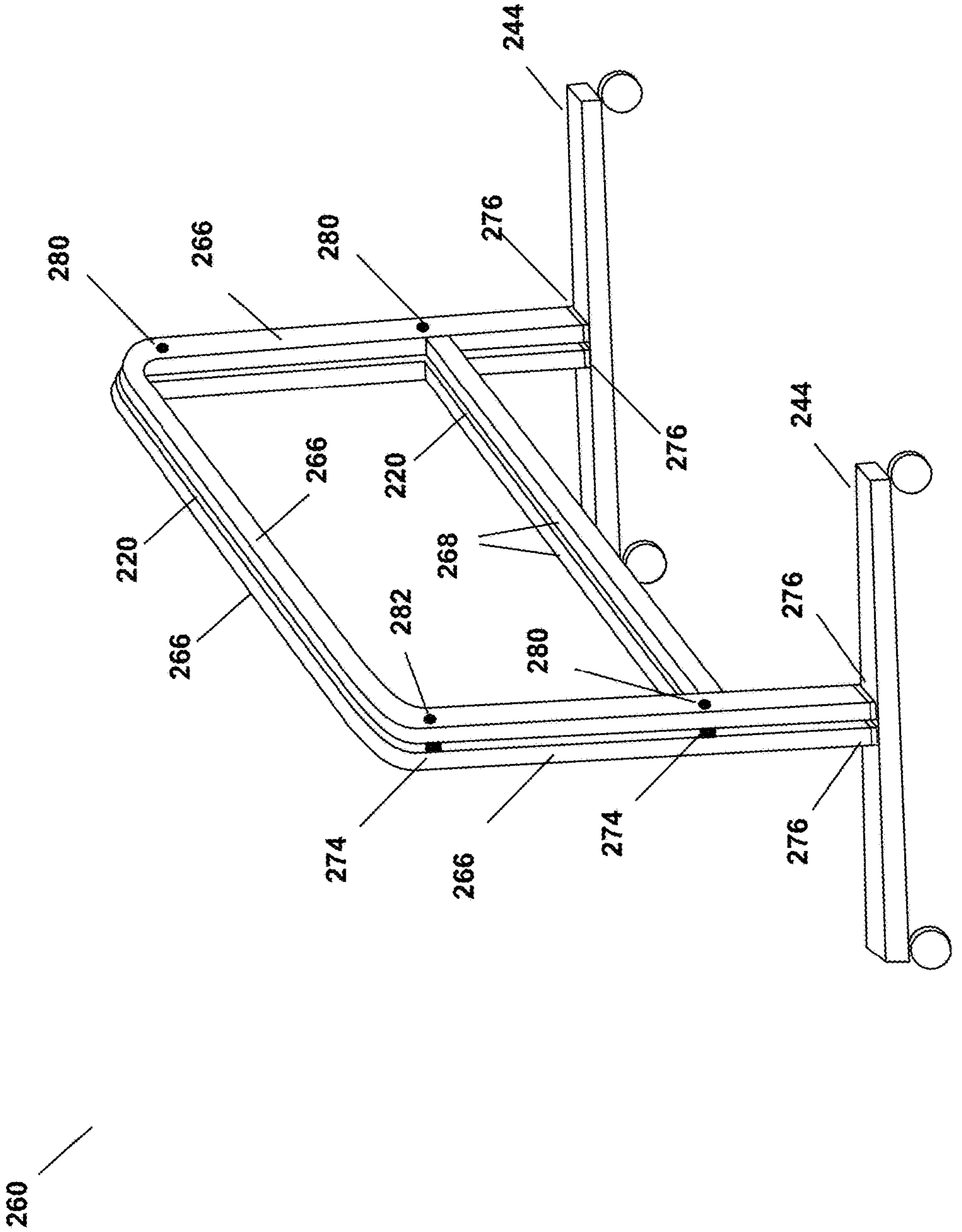
FIG. 5 shows a perspective view of a bent linear dual-rail mount platform module 260
Figure 6B:
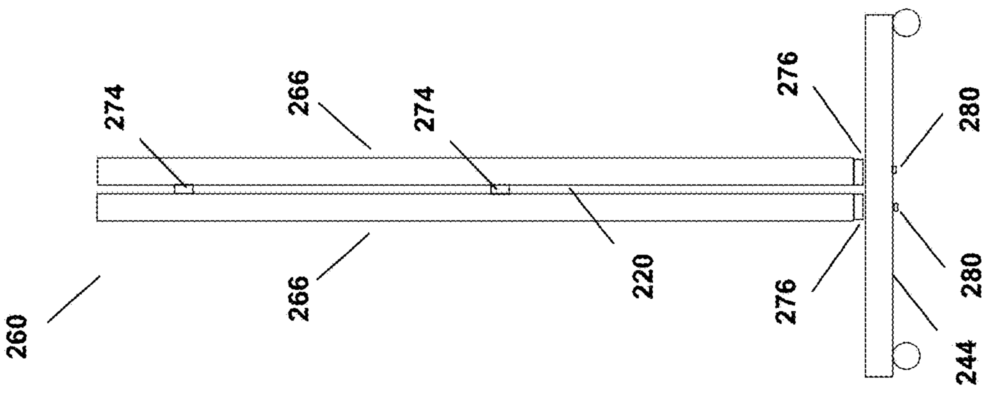
FIG. 6B shows a side view of the bent linear dual-rail mount platform module 260.
Figure 6A:
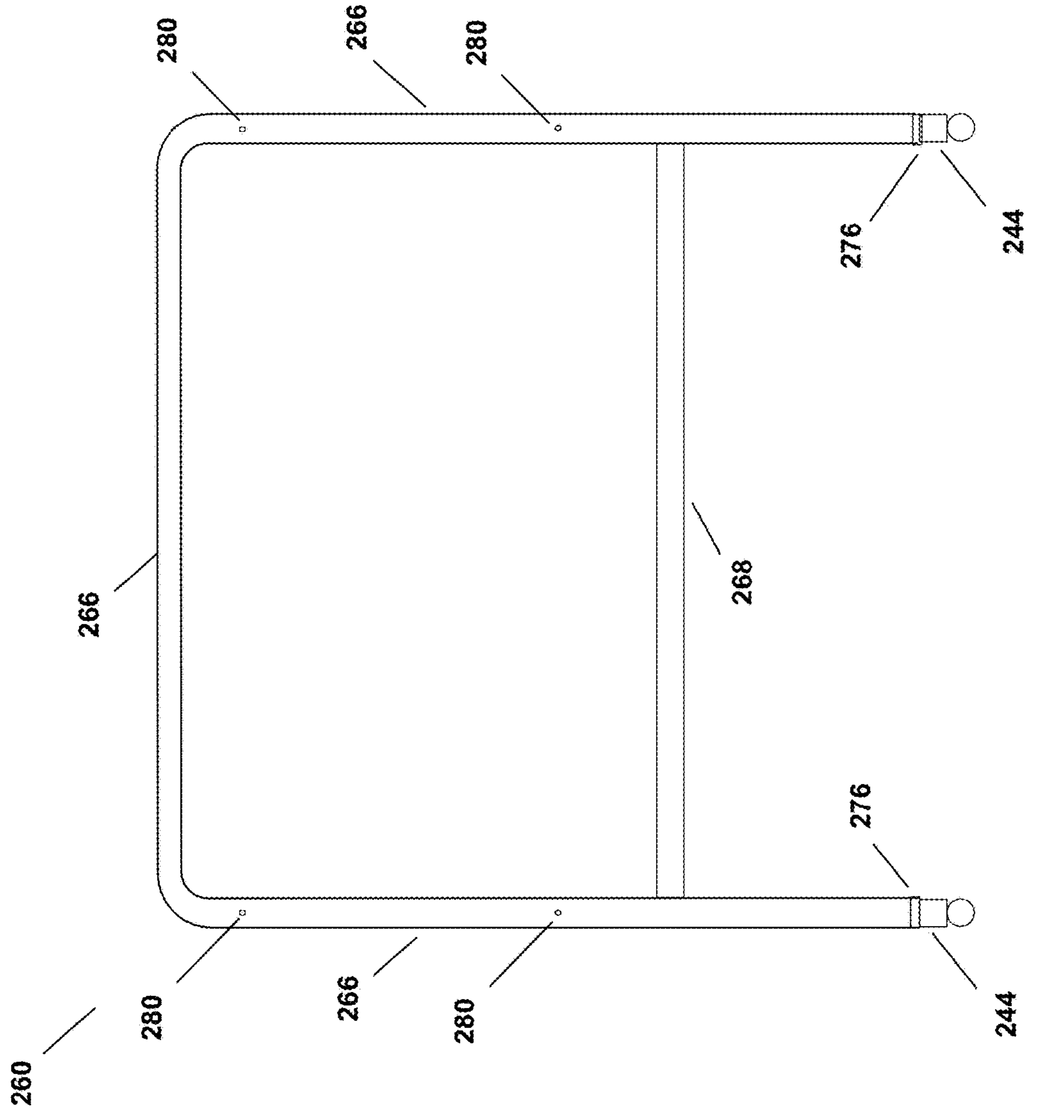
FIG. 6A shows a front view of the bent linear dual-rail mount platform module 260.
Figure 6C:
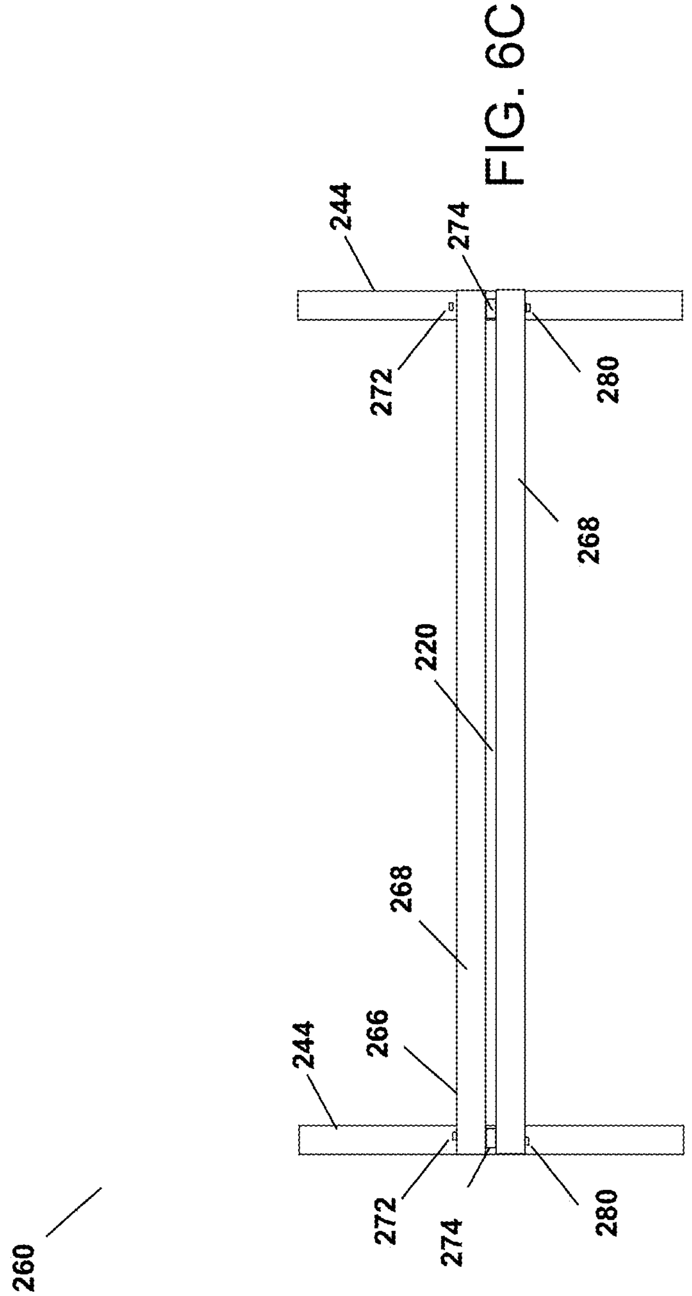
FIG. 6C shows a top view of the bent linear dual-rail mount platform module 260.

FIG. 5 shows a perspective view of a bent linear dual-rail mount platform module 260. The bent linear dual-rail mount platform module 260 comprises two double bent rails 266 and two horizontal single rails 268. FIG. 6A shows a front view of the bent linear dual-rail mount platform module 260. FIG. 6B shows a side view of the bent linear dual-rail mount platform module 260. FIG. 6C shows a top view of the bent linear dual-rail mount platform module 260. The bent linear dual-rail mount platform module 260 comprises two double bent rails 266 and two horizontal single rails 268 Each double bent rail 266 is a square tube (typically 1¼"×1¼", typically 9 feet long prior to bending) that is bent 90 degrees in 2 places to form 3 equal lengths (typically 3 feet each). Two end plates 276 are coupled each double bent rail 266, one at each end. Each end plate 276 has a threaded fastener hole 282 to facilitate coupling with other components. Each single rail 268 is coupled to one of the double bent rails 266, preferably by welding, but other fastening methods may be used. The two double bent rails 266 are coupled together in parallel with fasteners 280. A mount slot 220 is formed between the two double bent rails 266 by a plurality spacers 274 positioned between the two double bent rails 266 and held in place by fasteners 280 pushed through fastener holes in the two double bent rails 266. The fasteners 280 are held in place by threaded retainers 272 or other suitable retainers. The spacers 274 each have a hole through which the fasteners 280 can pass.

The mount slot 220 is wide enough to just barely allow the shaft of a typical fastener used with the system, but not wide enough to allow the head of the typical fastener to pass through. In the shown embodiment the typical fastener used has a 3/8" diameter shaft and the gap is 13/32." In the shown embodiment, two dual-sided footings 244 are attached to the two double bent rails 266. In alterative embodiments, shorter single-sided footings may be used. Each footing 244 is coupled to the double bent rails 266 with two fasteners 280 engaging with the threaded end plates 276 on the end of each double bent rail 266. A plurality of casters (or leg levelers) are coupled to each footing 244.

The bent linear dual-rail mount platform module 260 dissembles and assembles easily since only each sub-assembly of one double bent rail 266 and one single rail 268 is welded. This sub-assembly of one double bent rail 266 and one single rail 268 stores flat which minimizes weight, is a compact size, and allows for ease of physical handling. The bent linear dual-rail mount platform module 260 stores disassembled for minimal space in packaging, shipping and stocking or storage. The bent linear dual-rail mount platform module 260 need only be assembled when and where needed for its usage. Square tube construction provides strong strength integrity with capability and capacity for attaching objects.

Figure 7A:
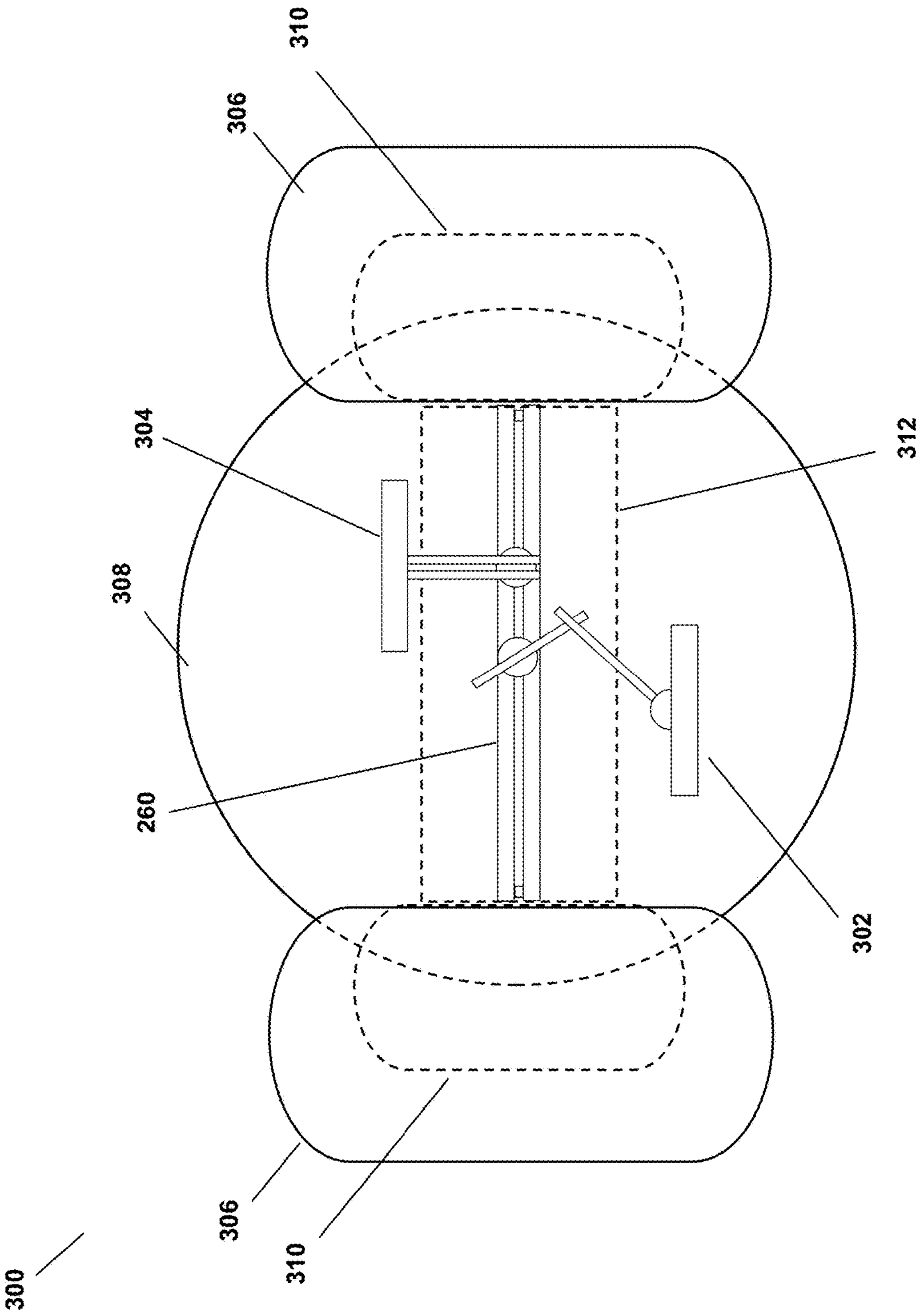
FIG. 7A shows a top view of a first embodiment bent linear dual-rail mount platform workstation 300.
Figure 7B:
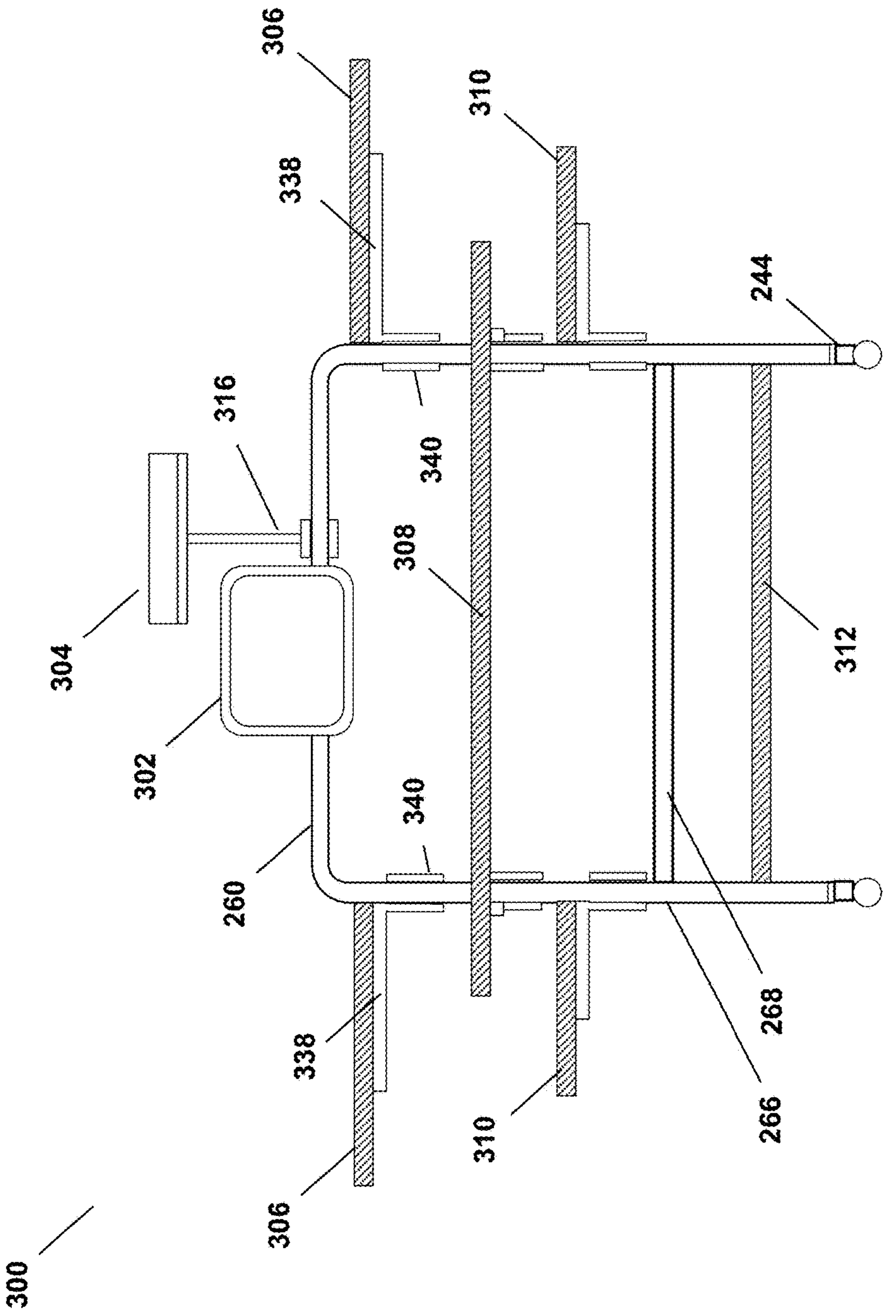
FIG. 7B shows a front view of the first embodiment bent linear dual-rail mount platform workstation 300.
Figure 7C:
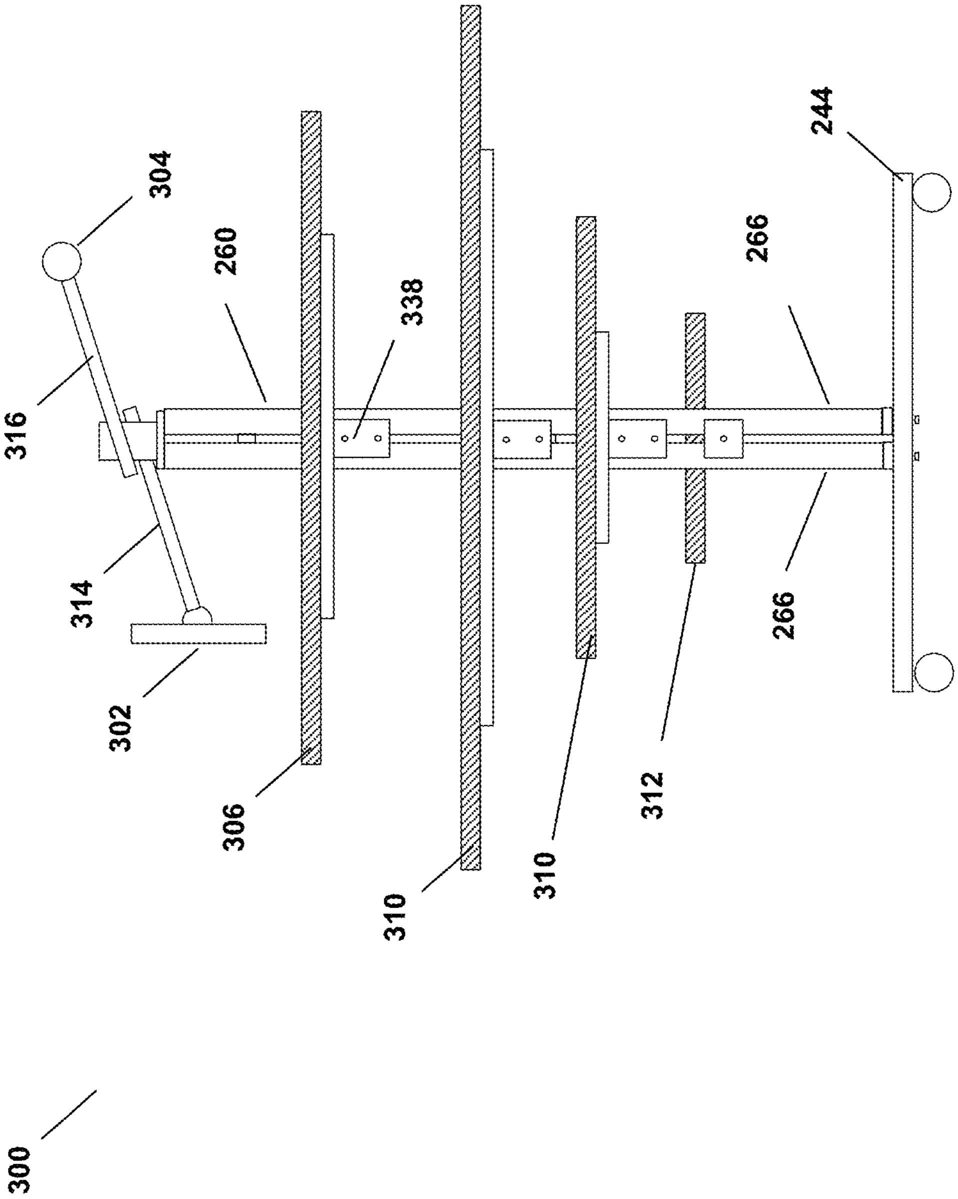
FIG. 7C shows a side view of first embodiment bent linear dual-rail mount platform workstation 300.

FIG. 7A shows a top view of a first embodiment bent linear dual-rail mount platform workstation 300. FIG. 7B shows a front view of the first embodiment bent linear dual-rail mount platform workstation 300. FIG. 7C shows a side view of first embodiment bent linear dual-rail mount platform workstation 300. The first embodiment bent linear dual-rail mount platform workstation 300 has a bent linear dual-rail mount platform module 260 to which are attached two upper wing work surfaces 306, an upper center work surface 308, two lower wing work surfaces 310 and a lower center work surface 312. A monitor 302 and a light fixture 304 are mounted via a monitor accessory arm 314 and a light fixture accessory arm 316 to the top of the bent linear dual-rail mount platform module 260. The work surfaces (306, 308, 310, 312) are coupled to the bent linear dual-rail mount platform module 260 with accessory arms 338 and backer plates 340.

Figure 8A:
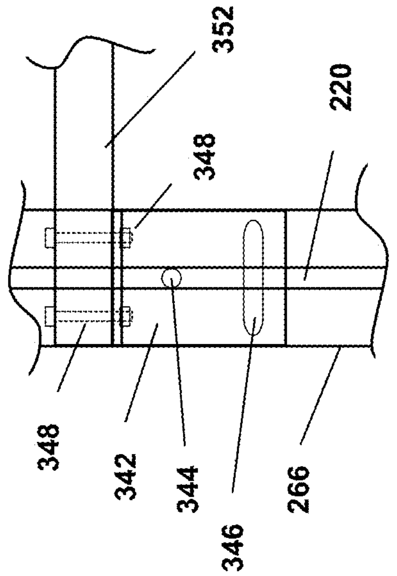
FIG. 8A shows a side view of an L bracket 342 for use with the bent linear dual-rail mount platform module 260.
Figure 8B:
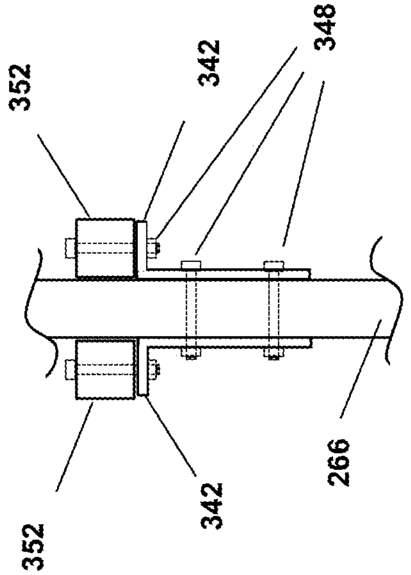
FIG. 8B shows a front view of the L bracket 342.

FIG. 8A shows a side view of an L bracket 342 for use with the bent linear dual-rail mount platform module 260. FIG. 8B shows a front view of the L bracket 342. The L bracket 342 has a vertical portion and a horizontal portion. The L bracket 342 is configured to attach to an accessory arm 352 with two fasteners 348 passing through fastener holes in the accessory arm 352, through fastener holes in the horizontal part of the L bracket 342 and secured with fastener retainers. The vertical portion of the L bracket 342 has a fastener hole 344 and a fastener slot 346. A first fastener can be pushed through the fastener hole 344 and through the mount slot 220 and secured on the other side with a threaded hole backer plate 340 or a retainer. A second fastener can be pushed through the fastener slot 346 and through the mount slot 220 and secured on the other side with a threaded hole backer plate 340 or a retainer. The second fastener can be slightly loosened sot that the L bracket 342 can rotate around the first fastener in the fastener hole 344, allowing the L bracket 342 and the attached accessory arm 352 to be tilted a few degrees upward or downward.

Figure 9A:
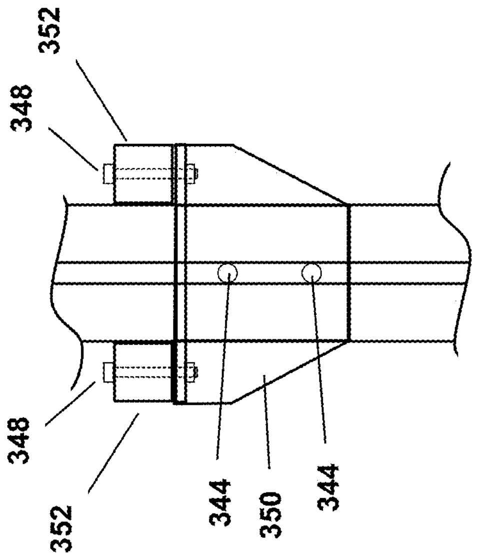
FIG. 9A shows a side view of a Y bracket 350 for use with the bent linear dual-rail mount platform module 260.
Figure 9B:
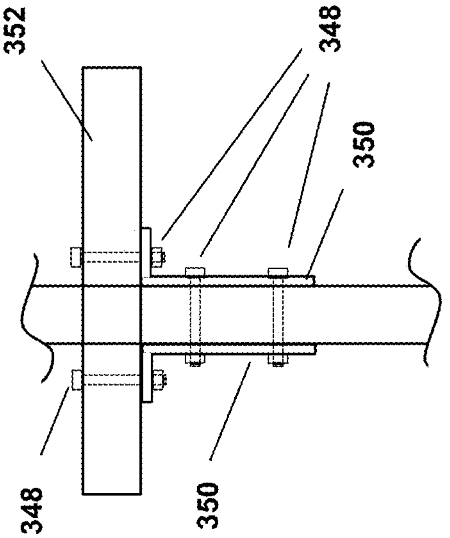
FIG. 9B shows a front view of the Y bracket 350.

FIG. 9A shows a side view of a Y bracket 350 for use with the bent linear dual-rail mount platform module 260. FIG. 9B shows a front view of the Y bracket 350. The Y bracket 350 has a vertical portion and a horizontal portion. The Y bracket 350 is configured to attach to a double T accessory arm 354 or pair of single rail accessory arms 352 with a fastener 348 passing through a fastener hole in each of the two rails of the double T accessory arm 354, through fastener holes in the horizontal parts of the L bracket 342 and secured with fastener retainers. The vertical portion of the Y bracket 350 has two fastener holes 344. Two fastener 348 can be pushed through the two fastener holes 344 and through the mount slot 220 and secured on the other side with threaded hole backer plates 340 or retainers.

Figure 10:
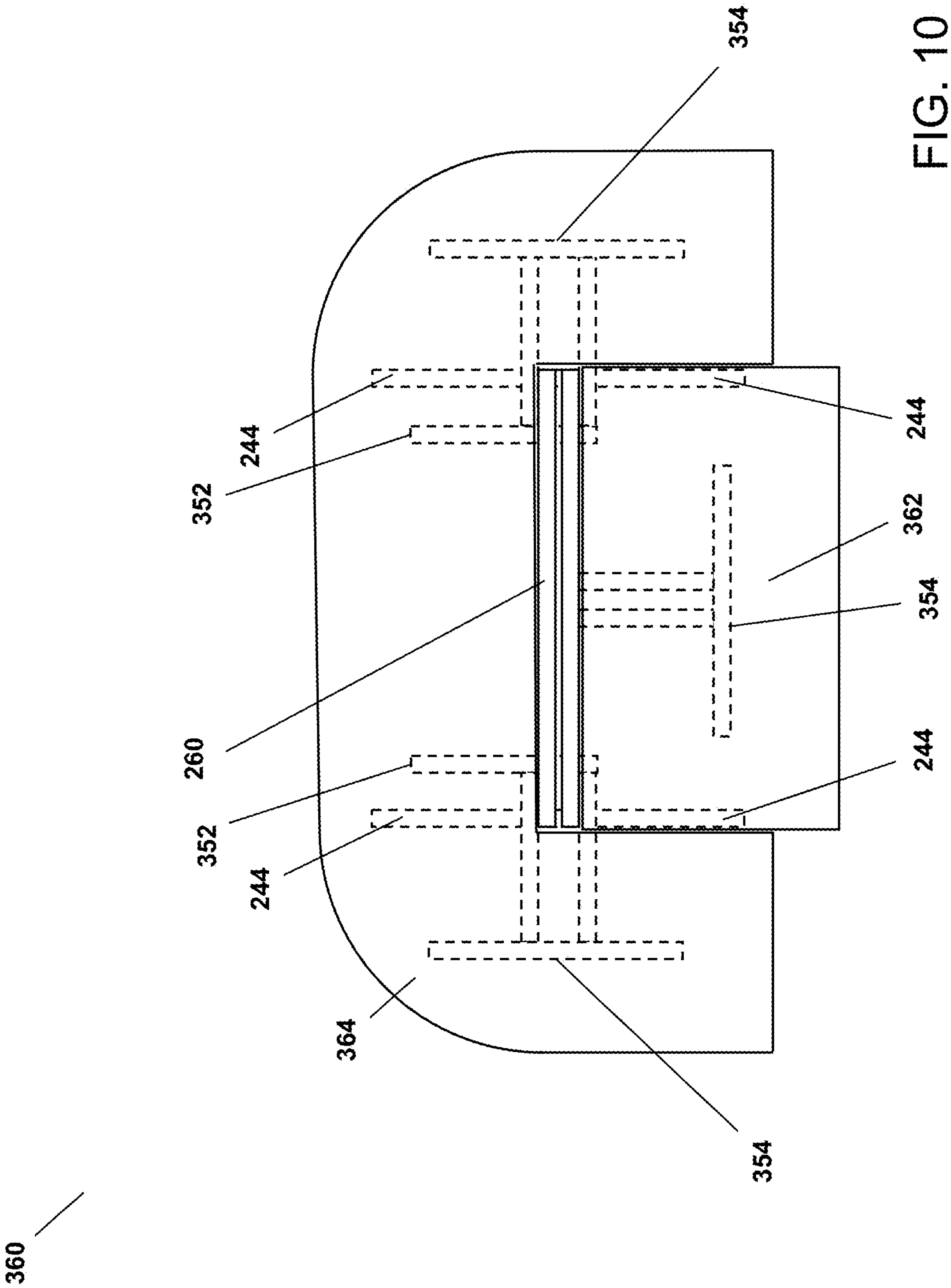
FIG. 10 shows a top view of a second embodiment bent linear dual-rail mount platform workstation 360.

FIG. 10 shows a top view of a second embodiment bent linear dual-rail mount platform workstation 360. The second embodiment bent linear dual-rail mount platform workstation 360 has a bent linear dual-rail mount platform module 260 on which is attached a center work surface 362 and a wrap around work surface 364. The center work surface 362 is supported by a double T accessory arm 354 that is secured by a L bracket 342 to a short double rail slot column 168 (not shown in FIG. 10) attached to the bent linear dual-rail mount platform module 260. The L bracket 342 allows the center work surface 362 to change tilt as well as adjust elevation. The wrap around work surface 364 is supported by two double T accessory arms 354 and two single accessory arms 352. The two double T accessory arms 354 are each attached to the bent linear dual-rail mount platform module 260 by a Y bracket 350. The two accessory arms 352 are each attached to the ends of one of the two double T accessory arms 354.

Figure 11:
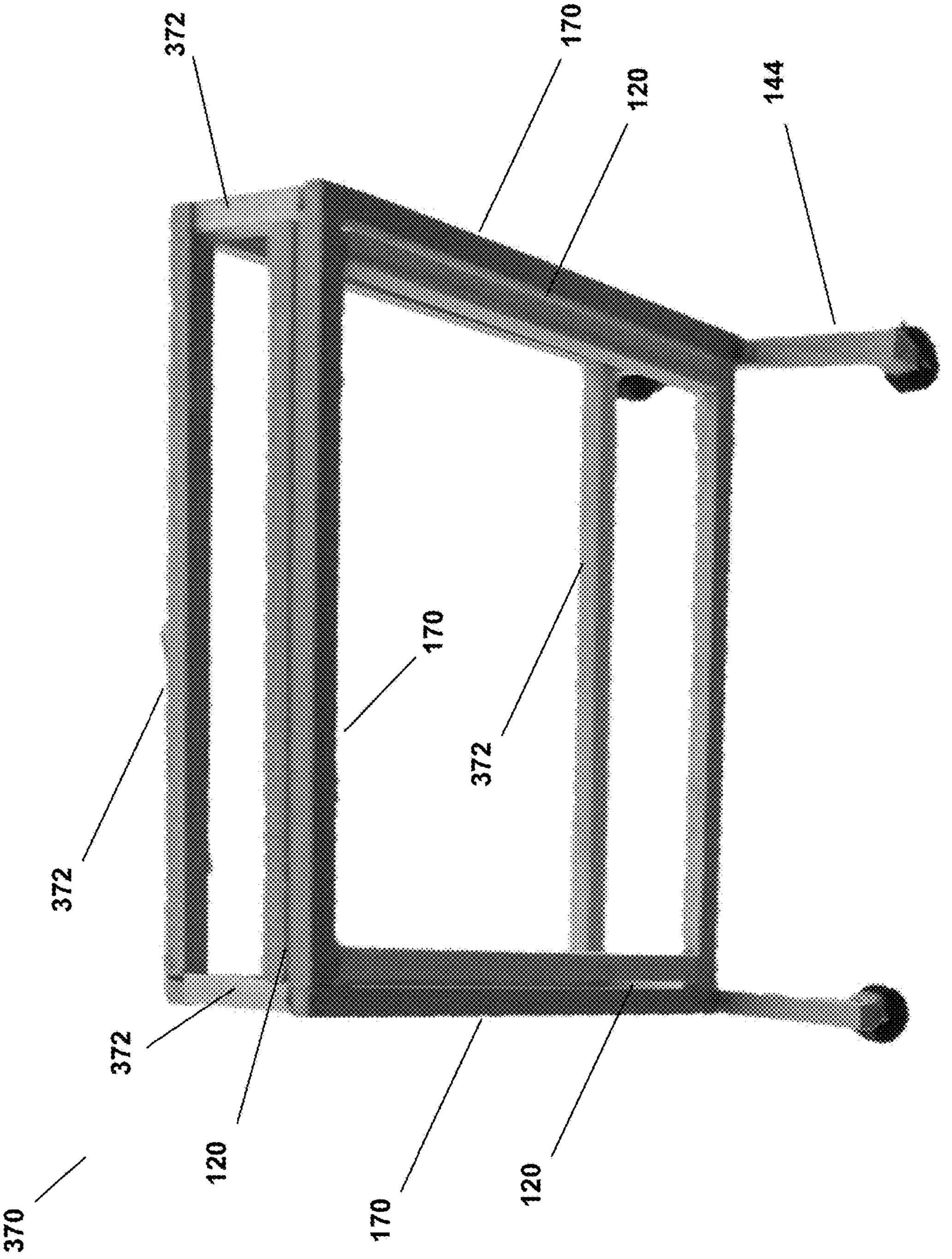
FIG. 11 shows a perspective view of a fourth embodiment welded linear dual-rail mount platform module 370.

FIG. 11 shows a perspective view of a fourth embodiment welded linear dual-rail mount platform module 370. The fourth embodiment welded linear dual-rail mount platform module 370 is similar to the second embodiment welded linear dual-rail mount platform module 172 with the addition of several single rails 372 to create a narrow box structure. Additionally, the mount slots 120 on the vertical dual rail slot beams 170 face forward instead of to the sides.

Figure 12:
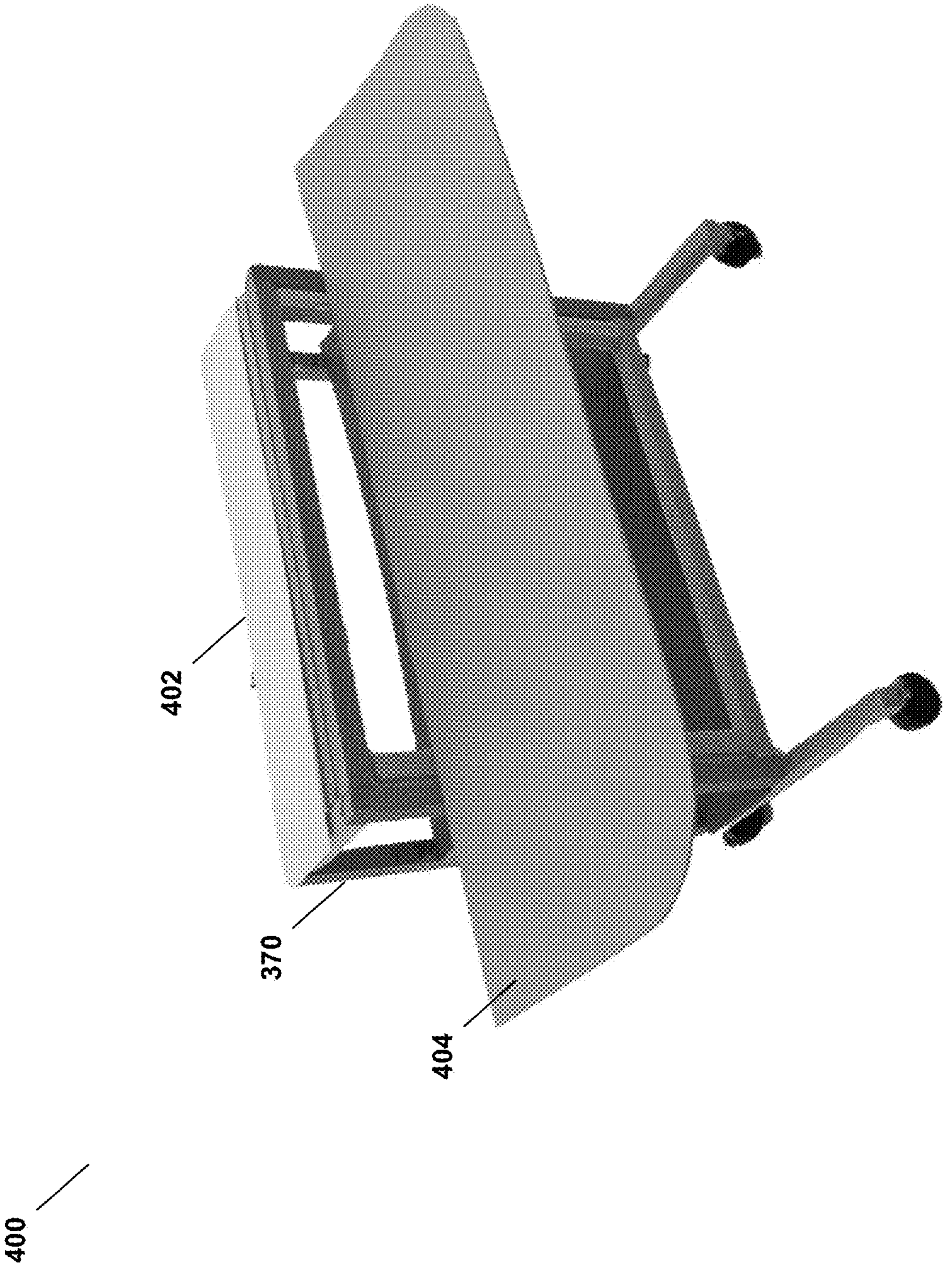
FIG. 12 shows a perspective view of a first embodiment welded linear dual-rail mount platform workstation 400.

FIG. 12 shows a perspective view of a first embodiment welded linear dual-rail mount platform workstation 400. The first embodiment welded linear dual-rail mount platform workstation 400 has a fourth embodiment welded linear dual-rail mount platform module 370 with a top work surface 402 and a middle work surface 404.

Figure 13:
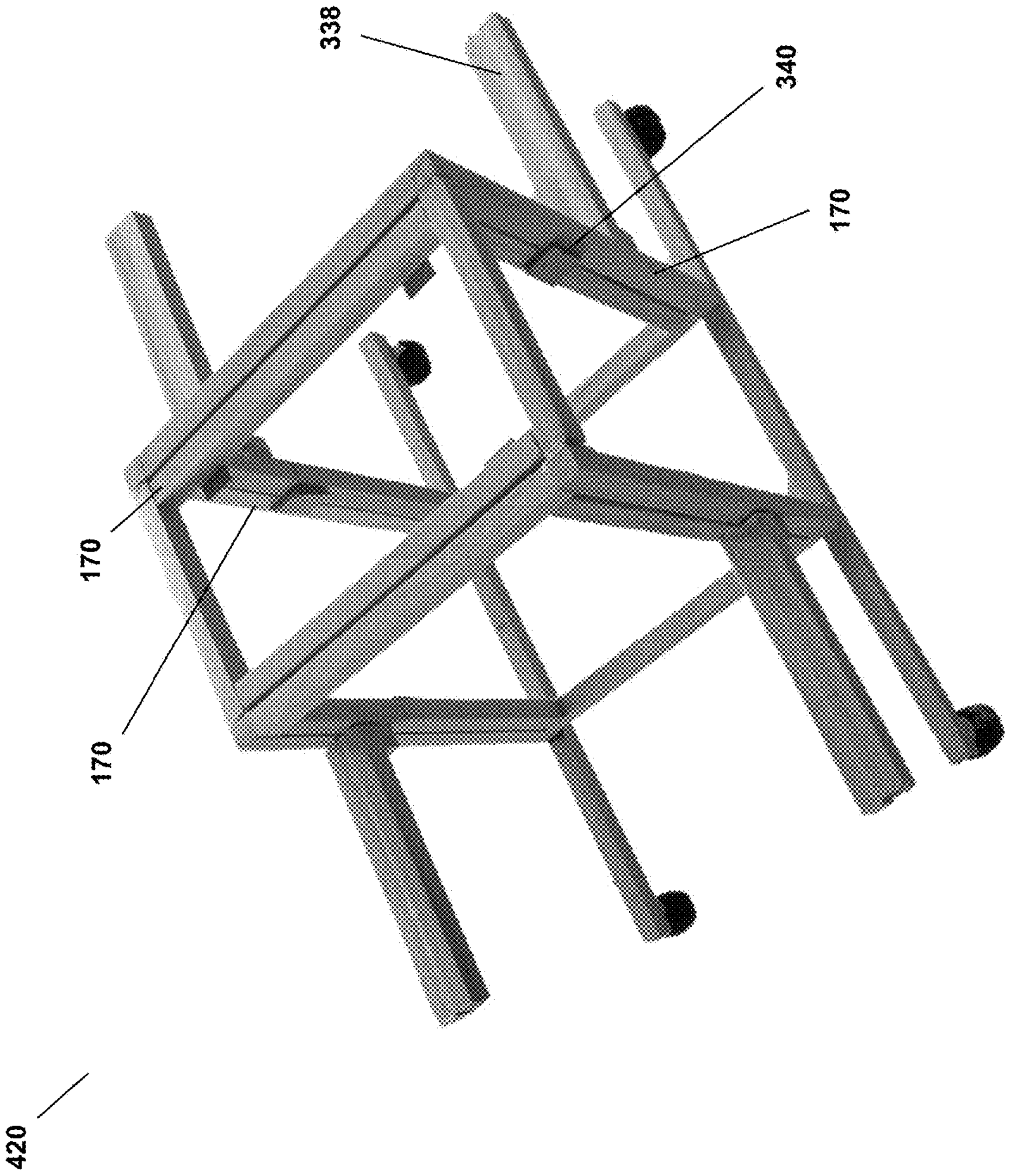
FIG. 13 shows a perspective view of a fifth embodiment welded linear dual-rail mount platform module 420.

FIG. 13 shows a perspective view of a fifth embodiment welded linear dual-rail mount platform module 420. The fifth embodiment welded linear dual-rail mount platform module 420 is similar to the fourth embodiment welded linear dual-rail mount platform module 370 with the addition of two more vertical dual rail slot beams 170 to replace two of the vertical single rails 372 and the addition of a horizontal dual rail slot beam 170 to replace one of the horizontal single rails 372.

Figure 14:
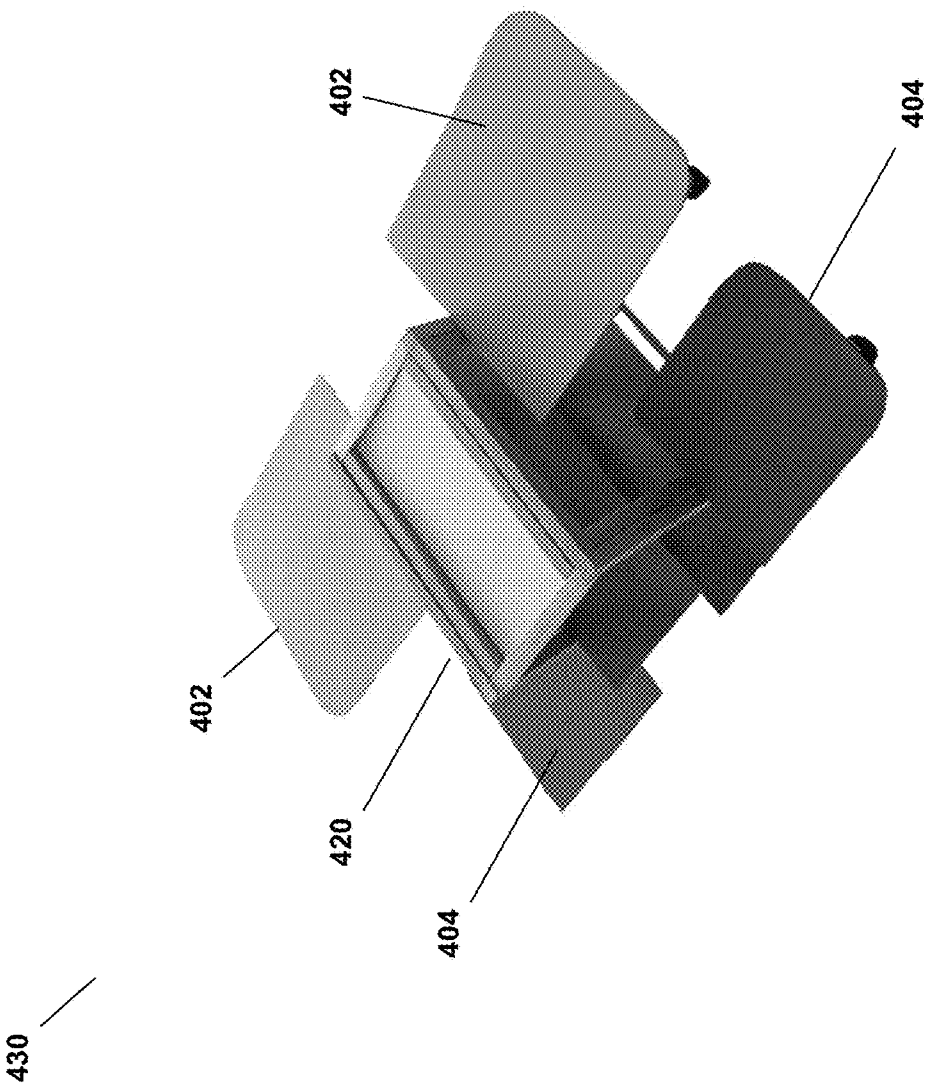
FIG. 14 shows a perspective view of a second embodiment welded linear dual-rail mount platform workstation 430.

FIG. 14 shows a perspective view of a second embodiment welded linear dual-rail mount platform workstation 430. The second embodiment welded linear dual-rail mount platform workstation 430 has a fifth embodiment welded linear dual-rail mount platform module 420 with two top work surfaces 402 and two middle work surfaces 404.

What is claimed is:

1. A workstation module comprising:

a first double bend rail coupled in parallel to a second double bend rail, each double bend rail comprising a square tube with a first length, a second length, and a third length, a first bend between the first length and the second length, and a second bend between the second length and the third length, wherein the first and second bends are bent 90 degrees, each of the double bend rails with a plurality of fastener holes passing therethrough;

a plurality of fasteners coupling the first double bend rail and the second double bend rail, each fastener passing through at least one of the fastener holes in each of the double bend rails; and a plurality of spacers positioned between the first double bend rail and the second double bend rail maintaining a mount slot therebetween, the spacers each having uniform width.

2. The workstation module of claim 1, wherein each spacer has a spacer hole through the spacer, each spacer hole aligning with one of the fastener holes in each of the double bend rails.

3. The workstation module of claim 1, wherein the first, second, and third lengths of the first double bend rail are equal in length to the respective first, second, and third lengths of the second double bend rail.

4. The workstation module of claim 1, wherein the plurality of spacers maintain the mount slot wide enough to allow a $\frac{3}{8}$ inch diameter shaft of a typical fastener used with the workstation module to pass through the mount slot, but not wide enough to allow a head of the typical fastener to pass through the mount slot.

5. The workstation module of claim 1, wherein the mount slot is at least $\frac{3}{8}$ of an inch wide.

6. The workstation module of claim 1, wherein the mount slot is no more than $\frac{13}{32}$ of an inch wide.

7. The workstation module of claim 1, wherein the mount slot is at least $\frac{3}{8}$ of an inch wide and no more than $\frac{13}{32}$ of an inch wide.

8. The workstation module of claim 1, wherein each of the double bend rails is $1\frac{1}{4}$ inch square cross-section.

9. The workstation module of claim 1, further comprising:

a horizontal dual rail slot beam comprising a pair of horizontal rails arranged in parallel, wherein a first end of a first of the pair of horizontal rails is coupled to the first length of the first double bend rail and a second end of the first of the pair of horizontal rails is coupled to the third length of the first double bend rail, wherein a first end of a second of the pair of horizontal rails is coupled to the first length of the second double bend rail and a second end of the second of the pair of horizontal rails is coupled to the third length of the second double bend rail.

10. The workstation module of claim 9, wherein each spacer has a spacer hole through the spacer, each spacer hole aligning with one of the fastener holes in each of the double bend rails;

wherein the first, second, and third lengths of the first double bend rail are equal in length to the respective first, second, and third lengths of the second double bend rail; and wherein the mount slot is at least $\frac{3}{8}$ of an inch wide and no more than $\frac{13}{32}$ of an inch wide.

* * * * *